United States Patent
Kallander et al.

(10) Patent No.: US 9,917,778 B2
(45) Date of Patent: Mar. 13, 2018

(54) PACKET TRANSMISSIONS

(71) Applicant: Microsoft Technology Licensing, LLC, Redmond, WA (US)

(72) Inventors: Olof Kallander, Stockholm (SE); Matej Kohut, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 14/853,248

(22) Filed: Sep. 14, 2015

(65) Prior Publication Data

US 2017/0063691 A1 Mar. 2, 2017

(30) Foreign Application Priority Data

Sep. 1, 2015 (GB) .................................. 1515496.6

(51) Int. Cl.

| H04L 12/26 | (2006.01) |
|---|---|
| H04L 12/801 | (2013.01) |
| H04L 29/06 | (2006.01) |
| H04L 1/00 | (2006.01) |
| H04L 12/24 | (2006.01) |
| H04L 12/825 | (2013.01) |
| H04L 12/805 | (2013.01) |

(52) U.S. Cl.
CPC ............ *H04L 47/11* (2013.01); *H04L 1/0006* (2013.01); *H04L 41/0896* (2013.01); *H04L 43/0858* (2013.01); *H04L 43/0894* (2013.01); *H04L 43/16* (2013.01); *H04L 43/50* (2013.01); *H04L 47/26* (2013.01); *H04L 65/60* (2013.01); *H04L 47/365* (2013.01)

(58) Field of Classification Search
None
See application file for complete search history.

(56) References Cited

U.S. PATENT DOCUMENTS

| 6,466,574 B1 | 10/2002 | Fujisaki et al. |
| 7,035,220 B1 * | 4/2006 | Simcoe .................. H04L 47/10 370/236 |

(Continued)

FOREIGN PATENT DOCUMENTS

| CN | 104168613 A | 11/2014 |
| EP | 2728799 | 5/2014 |

(Continued)

OTHER PUBLICATIONS

"International Search Report and Written Opinion", Application No. PCT/US2016/049419, dated Nov. 30, 2016, 14 pages.

(Continued)

*Primary Examiner* — Anh-Vu Ly
(74) *Attorney, Agent, or Firm* — Schwegman Lundberg & Woessner, P.A.

(57) ABSTRACT

There is provided an apparatus comprising: at least one processor; and a memory comprising code that, when executed on the at least one processor, causes the apparatus to: transmit, or arrange to transmit, a stream of packets to another apparatus; determine, at a first time, whether or not the number of packet pairs in the stream is above a threshold; and, if the number of packet pairs in the stream is determined to be below the threshold, configure future packet transmissions to the other apparatus to have more packet pairs.

18 Claims, 2 Drawing Sheets

(56) References Cited

U.S. PATENT DOCUMENTS

| | | |
|---|---|---|
| 7,130,268 B2 | 10/2006 | Mascolo |
| 7,133,368 B2 | 11/2006 | Zhang et al. |
| 7,180,858 B1 | 2/2007 | Roy et al. |
| 7,668,968 B1 | 2/2010 | Smith |
| 8,451,728 B2 | 5/2013 | Todd et al. |
| 8,582,644 B2 | 11/2013 | Lu et al. |
| 8,773,993 B2 | 7/2014 | Shojania et al. |
| 2002/0116154 A1* | 8/2002 | Nowak ............... H04L 12/2697 702/186 |
| 2005/0083849 A1* | 4/2005 | Rui ..................... H04L 43/0882 370/252 |
| 2007/0076742 A1* | 4/2007 | Du ......................... H04L 47/14 370/445 |
| 2007/0242616 A1* | 10/2007 | Chang ................ H04L 43/0858 370/252 |
| 2009/0252151 A1 | 10/2009 | Rappe |
| 2010/0046504 A1 | 2/2010 | Hill |
| 2011/0128864 A1* | 6/2011 | Chan .................. H04L 43/0864 370/252 |
| 2014/0119214 A1* | 5/2014 | Jeon ........................ H04L 43/50 370/252 |
| 2016/0105353 A1* | 4/2016 | Cociglio ............. H04L 43/0829 370/252 |
| 2016/0218976 A1* | 7/2016 | Agarwal ............... H04L 47/115 370/252 |

FOREIGN PATENT DOCUMENTS

| | | |
|---|---|---|
| JP | 2009267978 A | 11/2009 |
| JP | 2010258850 A | 11/2010 |
| KR | 20080037762 A | 5/2008 |

OTHER PUBLICATIONS

Melander, "A new End-to-End Probing and Analysis Method for Estimation Bandwidth Bottlenecks", In Proceedings of IEEE Global Telecommunications Conference, vol. 1, Nov. 27, 2000, 6 Pages.

Begen, et al., "Duplicating RTP Streams", Published on: Feb. 20, 2014 Available at: https://tools.ietf.org/pdf/draft-ietf-avtext-rtp-duplication-06.pdf.

Schulzrinne, et al., "RTP: A Transport Protocol for Real-Time Applications", Published on: Jul. 2003 Available at: https://tools.ietf.org/html/rfc3550.

J, et al., "Architecture, Implementation, and Evaluation of a Concurrent Multi-path Real-time Transport Control Protocol", In Proceedings of IEEE Military Communications Conference, Oct. 29, 2007, pp. 1-7.

"Second Written opinion Issued in PCT Application No. PCT/US2016/049419", dated Aug. 2, 2017, 7 Pages.

"International Preliminary Report on Patentability Issued in PCT Application No. PCT/US2016/049419", dated Nov. 10, 2017, 8 Pages.

* cited by examiner

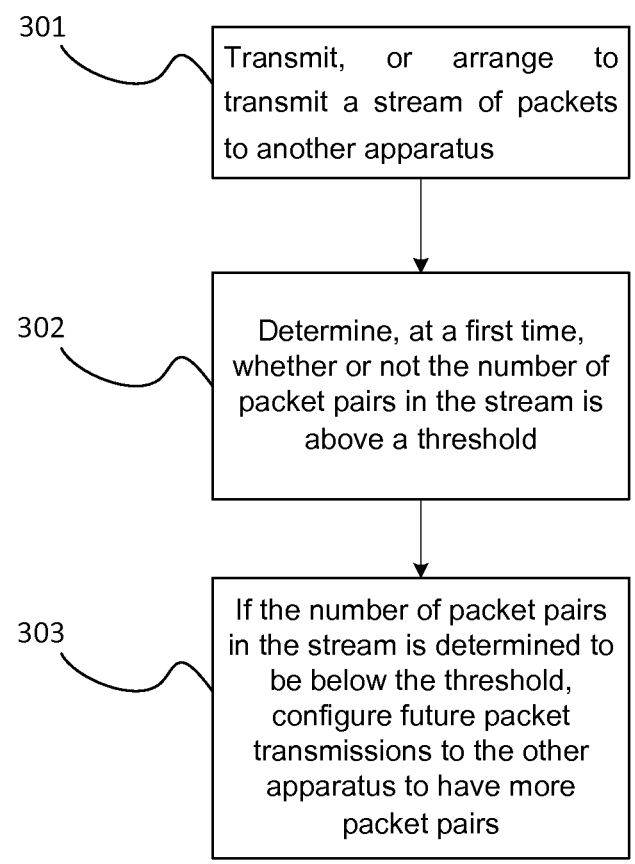

PACKET TRANSMISSIONS

RELATED APPLICATION

This application claims priority under 35 USC 119 or 365 to Great Britain Application No. 1515496.6 filed Sep. 1, 2015, the disclosure of which is incorporated by reference in its entirety.

BACKGROUND

Users may communicate with each other in real-time using data packets transmitted between respective user terminals. Example real-time communications include audio and/or video calls. To enable this real-time communication, the user terminals set up a session for transmitting packetized data. As the session continues, the available bandwidth in the network may vary, causing for a link to become underutilised or for it to become overloaded. It is therefore useful for a user terminal to be able to assess the capacity of a link over which a communication session is being transmitted by that terminal.

One way of assessing the capacity of a link is to look at all of the User Datagram Protocol/Internet Protocol (UDP/IP) packets coming in on the receiver side and to determine the capacity from the number of correctly received packets.

Another way of assessing the capacity of a link is to transmit packet pairs. A packet pair is a pair of packets, one of which being transmitted very soon (immediately or almost immediately) after the other packet. As the time between the transmission of the two packets is minimal, any spread in the delay in the arrival time of the packet pair at a receiver may be attributed to at least one bottleneck in the network. In the case that there is a bottleneck in the system, the bandwidth of the system may be considered to be equal to the bandwidth of the bottleneck, and future transmissions may be treated accordingly.

SUMMARY

The inventors have realised that there is a need to assess the maximum capacity of the network when transmitting packetized data. In particular, the inventors have realised that there is a need to assess the maximum capacity quickly (i.e. on establishing a session) and to ensure that the assessment method does not require multiple resources to inform the receiving user terminal to expect packet pairs.

According to a first aspect, there is provided an apparatus comprising: at least one processor; and a memory comprising code that, when executed on the at least one processor, causes the apparatus to: transmit, or arrange to transmit, a stream of packets to another apparatus; determine, at a first time, whether or not the number of packet pairs in the stream is above a threshold; and, if the number of packet pairs in the stream is determined to be below the threshold, configure future packet transmissions to the other apparatus to have more packet pairs.

According to a second aspect, there is provided a method comprising: transmitting or arranging to transmit a stream of packets to another apparatus; determining, at a first time, whether or not the number of packet pairs in the stream is above a threshold; and if the number of packet pairs in the stream is determined to be below the threshold, configuring future packet transmissions to the other apparatus to have more packet pairs.

According to a third aspect, there is provided a computer program product comprising computer code that, when run on an apparatus, causes the apparatus to: transmit or arrange to transmit a stream of packets to another apparatus; determine, at a first time, whether or not the number of packet pairs in the stream is above a threshold; and if the number of packet pairs in the stream is determined to be below the threshold, configure future packet transmissions to the other apparatus to have more packet pairs.

FIGURES

For a better understanding of the subject matter and to show how the same may be carried into effect, reference will now be made by way of example only to the following drawings in which:

FIG. 3 is a flow chart illustrating possible actions implemented by a transmitting apparatus.

DETAILED DESCRIPTION

Figure 1:
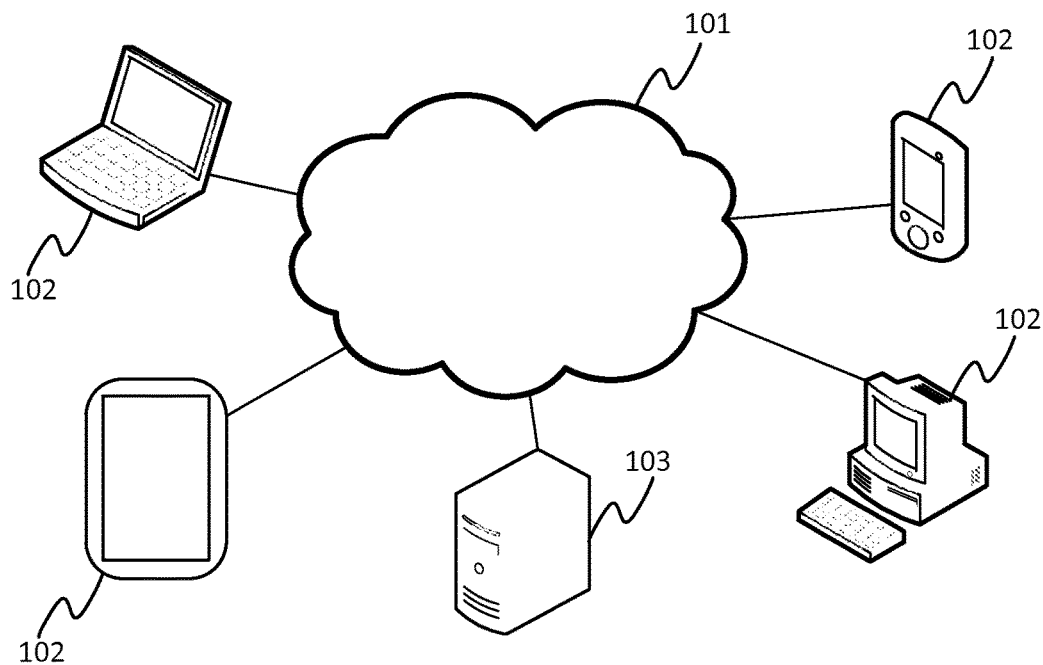
FIG. 1 is a schematic illustration of a communication system.

In general, there is provided an apparatus (aka the transmitting apparatus), such as a user terminal, comprising at least one processor; and a memory comprising code that, when executed on the at least one processor, causes the apparatus to transmit (or to arrange to transmit) a stream of packets to another apparatus. The transmitting apparatus may further be caused to determine, at a first time, whether or not the number of packet pairs in the stream is above a threshold. Thus, a user terminal may be configured to assess the packet stream currently being (and/or to be) transmitted in order to determine how many packet pairs are being transmitted. As mentioned above in the background section, a packet pair is a pair of packets, one of which being sent immediately after the other. The term "immediately" encompasses those cases in which there is a short (minimal) delay between the end of transmission of the first packet and the beginning of the transmission of the second packet. The delay may be caused by limitations on the transmitter of the transmitting apparatus, such as the time taken for the transmitting apparatus to process the second packet. The packet pairs may form part of a packet train, in which several (i.e. more than two) packets are sent immediately after each other. Usefully, packet pairs have the same size (although this is not strictly necessary to be considered as a packet pair). Having packets in the pair of at the same size (or approximately so) renders it more likely that each packet in the pair will be treated in similar ways as they traverse the network.

The transmitting apparatus is further configured with a threshold amount. The threshold amount may be pre-determined (i.e. stored in memory prior to the session being established) or determined during or after session establishment. This threshold amount may indicate the minimum number of packet pairs that should be transmitted per unit time in order to ensure that a receiver of the packet pair(s) (i.e. the receiving apparatus) can estimate the capacity of the network.

The usefulness of such a threshold may be seen in the following example. Suppose a single packet pair is sent and the capacity of the link is estimated as being more that, for example, 500 kbps. From this, it cannot be said by how much more the than 500 kbps. If a second packet pair is then sent, this may still lead for the capacity of the link as being estimated as being more than 500 kbps. In other words, it may not provide any further information on the capacity of the link. However, if the second packet pair is sent immediately (or very soon) after the first packet, this might be able to cause some congestion on the link, which will help with the capacity estimation. Therefore, the presently described technique causes a link to be flooded with packet pairs early on in a session with the aim of making the link congested in order that the capacity of the link made be determined relatively early in a session. This technique is also useful on links having a varying bandwidth capacity, as it allows real-time information to be used for shaping traffic transmissions. Therefore, the technique of purposefully causing congestion by transmission of packet pairs can be applied at different times throughout the session. To this effect, the threshold may be varied in response to a comparison of the determined network capacity with a previously determined network capacity. For example, the threshold may be increased if it is determined that an upper limit on the capacity has not yet been determined. Once an upper limit on the capacity has been determined, the apparatus may be configured to reduce the number of purposefully created packet pairs until the next time a determination of network capacity is desired.

If the number of packet pairs in the stream is determined to be below the minimum threshold, the transmitting apparatus may be further caused to configure future packet transmissions to the other (receiving) apparatus to have more packet pairs. By this, it is meant that the transmitting apparatus is caused to manipulate the transmissions of packetized data from the transmitting apparatus so that more packet pairs are transmitted per unit time than the amount of packet pairs previously determined as being transmitted.

In response to receiving the packet pairs, the other (receiving) apparatus is configured to determine an indication of the capacity of the network over which the stream is transmitted. This indication is transmitted from the other (receiving) apparatus to the transmitting apparatus as feedback. On receipt of this feedback, the transmitting apparatus (i.e. the transmitter of the packet pairs) may be configured to modify a transmission setting for the stream in dependence on the feedback. For example, if the feedback indicates that there is more capacity available in the network than previously assumed/determined, the transmitting apparatus may arrange to transmit a larger amount of data, or change the session parameters to ensure a more reliable transmission (depending on the data to be sent). If the feedback indicates that there is less capacity in the network than previously assumed/determined, the transmitting apparatus may arrange to transmit a smaller amount of data than previously planned, or otherwise change the session parameters to compensate for the smaller network capacity (depending on the data to be sent).

Now, by way of example only, we describe a potential communication system and user terminal into which the subject-matter of the present application may be put into effect. It is understood that the exact layout of this network is not limiting.

FIG. 1 shows an example of a communication system in which the teachings of the present disclosure may be implemented. The system comprises a communication medium 101, in embodiments a communication network such as a packet-based network, for example comprising the Internet and/or a mobile cellular network (e.g. 3GPP network). The system further comprises a plurality of user terminals 102, each operable to connect to the network 101 via a wired and/or wireless connection. For example, each of the user terminals may comprise a smartphone, tablet, laptop computer or desktop computer. In embodiments, the system also comprises a server 103 connected to the network 101. It is understood, however, that a server may not be used in certain circumstances, such as some peer-to-peer real-time communication protocols. The term server as used herein refers to a logical server, which may comprise one or more physical server units at one or more physical sites (i.e. the server 103 may or may not be distributed over multiple different geographic locations).

Figure 2:
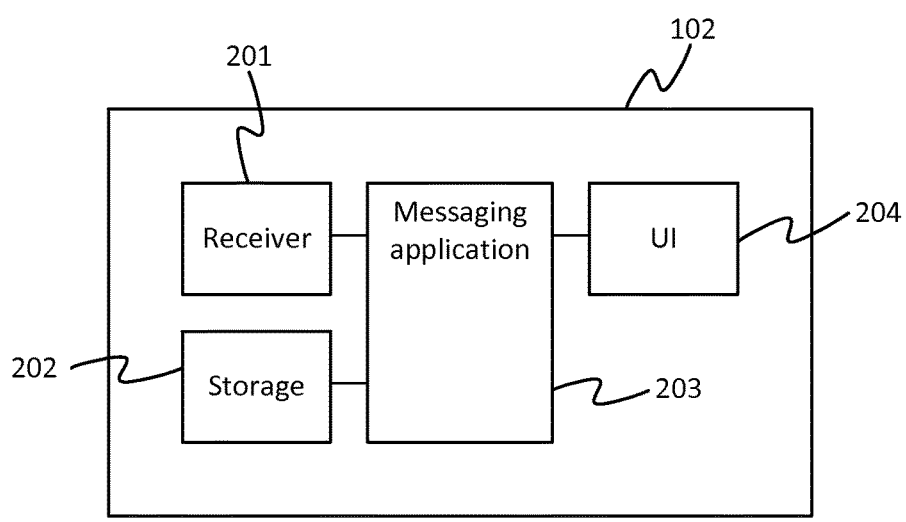
FIG. 2 is a schematic block-diagram of a user terminal.

FIG. 2 shows an example of one of the user terminals 102 in accordance with embodiments disclosed herein. The user terminal 102 comprises a receiver 201 for receiving data from one or more others of the user terminals 102 over the communication medium 101, e.g. a network interface such as a wired or wireless modem for receiving data over the Internet or a 3GPP network. The user terminal 102 also comprises a non-volatile storage 202, i.e. non-volatile memory, comprising one or more internal or external non-volatile storage devices such as one or more hard-drives and/or one or more EEPROMs (sometimes also called flash memory). Further, the user terminal comprises a user interface 204 comprising at least one output to the user, e.g. a display such as a screen, and/or an audio output such as a speaker or headphone socket. The user interface 204 will typically also comprise at least one user input allowing a user to control the user terminal 102, for example a touchscreen, keyboard and/or mouse input.

Furthermore, the user terminal 102 comprises a messaging application 203, which is configured to receive messages from a complementary instance of the messaging application on another of the user terminals 102, or the server 103 (in which cases the messages may originate from a sending user terminal sending the messages via the server 103, and/or may originate from the server 103).

The messaging application is configured to receive the messages over the network 101 (or more generally the communication medium) via the receiver 201, and to store the received messages in the storage 202. For the purpose of the following discussion, the described user terminal 102 will be considered as the receiving (destination) user terminal, receiving the messages from one or more other, sending ones of the user terminals 102. Further, any of the following may be considered to be the entity immediately communicating with the receiver: as a router, a hub or some other type of access node located within the network 101. It will also be appreciated that the messaging application 203 receiving user terminal 102 may also be able to send messages in the other direction to the complementary instances of the application on the sending user terminals and/or server 103 (e.g. as part of the same conversation), also over the network 101 or other such communication medium.

The messaging application may transmit audio and/or video data using any one of a variety of communication protocols/codecs. For example, audio data may be streamed over a network using a protocol known Real-time Transport Protocol, RTP (as detailed in RFC 1889), which is an end-to-end protocol for streaming media. Control data associated with that RTP transmitted data may be formatted using a protocol known as Real-time Transport Control Protocol, RTCP (as detailed in RFC 3550). Sessions between different apparatuses may be set up using a protocol such as the Session Initiation Protocol, SIP. RTP is a useful protocol for implementation of the presently described techniques as packet pairs are already supported by RTP and so can be sent from the very first media packet in the session. The form of the packet pairs presently described differs from those in RTP in at least one key respect. In RTP, the packet pairs are based on the RTCP protocol. As such, the packets of the packet pairs currently defined in RTP/RTCP do not carry any extra media data. In contrast, the presently described packet pairs may introduce more media data (for example, error recovery information). Furthermore, the packet pairs as described in the present application do not have to introduce any additional control information overhead to be implemented, which is different to the RTP/RTCP case in which there is control information overhead.

Although the RTP protocol has been mentioned, the presently described techniques may be implemented using a number of different real-time communication protocols. However, as the presently described techniques relate to measuring a time difference between transmitted packets, the real-time communication protocols relate to the transmission/reception of packetized data, such as UDP packets. The presently described techniques is mainly applicable to real-time media communications based on the UDP protocol. It may also be used for non-media communications (such as simple file transfer). However, usually the transmission control protocol (TCP) is used for non-media cases and TCP also provides a mechanism for estimating bandwidth.

It is also noted that some of the following described techniques (such as creating packet pairs by creating duplicate packets) does not require the transmitting apparatus to explicitly notify the receiving apparatus in any way that packet pairs are to be expected for providing feedback on and/or to provide information on how to recognise a packet pair. This is because on determining that a packet is a duplicate of an earlier received packet (which is determinable from the packet header), a receiving apparatus may autonomously determine that the duplicate packet forms part of a packet pair. In response to this autonomous determination, the receiving apparatus may be further configured to provide feedback to the transmitting device relating to the capacity (bandwidth) of the network through which the stream is being transmitted.

To illustrate the method described in the present application, we refer to the flowchart of FIG. 3. FIG. 3 illustrates steps that may be performed by an apparatus that is transmitting a stream to another apparatus to cause packet pairs to be transmitted.

In step 301, the transmitting apparatus is configured to transmit, or to arrange to transmit, a stream of packets to another apparatus. The stream of packets may be audio and/or video data packets transmitted using RTP. The stream of packets relate to the same session.

At step 302, the transmitting apparatus is configured to determine, at a first time, whether or not the number of packet pairs in the stream is above a threshold. As mentioned above, the threshold may be pre-determined (i.e. determined prior to the session related to the stream being established) or may be determined during or after the establishment of the session relating to the stream. In determining whether or not the number of packet pairs is above a threshold, this may be determined as a function per unit time. For example, the threshold could set a minimum number of packet pairs per unit time that should be transmitted (i.e. an average number of packets is required). The threshold may set a particular number of packet pairs to be transmitted from the beginning of the session. The first time may be set in relation to a time elapsed since the beginning of the session and may be predetermined. The threshold may set a minimum number of packet pairs to be transmitted consecutively by the transmitting apparatus as part of a packet train (in which packets are transmitted immediately after a preceding packet).

At step 303, the transmitting apparatus is configured to configure future packet transmissions in the stream to have more packet pairs if the number of packet pairs in the stream is determined to be below the threshold. By this, it is meant that the transmitting apparatus manipulates the stream to be transmitted to ensure that there are more packet pairs than would have occurred without this manipulation. This can be evidenced from an increase in the amount of packet pairs present in the transmission stream. There are numerous ways in which this can be done.

For example, the transmitting apparatus may be configured to create a packet pair by duplicating a packet. In other words, the packet pair may comprise two identical packets (or at least two packets comprising the same data). This method has at least three advantages. First, by using a duplicated packet as part of a packet pair, the two packets in the packet pair will be the same size and thus likely to be treated similarly as they traverse the network. Secondly, by using a duplicated packet as part of a packet pair, the apparatus receiving the packet pair may autonomously determine that the two packets form a packet pair and provide feedback information to the transmitting apparatus. Thirdly, the transmission of a duplicate packet provides redundancy for the original packet of the packet pair and so has additional value as error correction in the case a packet is lost or corrupted during transmission.

Another way in which the transmitting apparatus may be configured to create a packet pair is by shifting the transmission time of packets to create packet pairs. For example, the transmitting apparatus may analyse its stream to be transmitted and determine that it is scheduled to transmit one packet at time x and another packet at time x+t, where t is larger than the maximum time between the end of transmission of the first packet and the start of transmission of the second packet for the two packets to be treatable as a packet pair. In response to this determination, the transmitting apparatus is configured to alter the scheduling of the packets (for example, by delaying the transmission of the packet that was to be transmitted at time x) in order that the two packets are instead transmitted as a packet pair.

Another way in which the transmitting apparatus may be configured to create a packet pair is by splitting up larger packets into smaller packets to create packet pairs. As packets in packet pairs usefully have packets of approximately the same size, it would be useful to split up the larger packet into at least two packets having the same (or similar) size. The transmitting apparatus may be preconfigured with a minimum size for packet splitting, in order that packets below the minimum size are not split into at least two packets for transmission as packet pairs. The transmitting apparatus may also be preconfigured with a second minimum size for a packet, which is the smallest size packet that may be transmitted as part as a packet pair. This second minimum size may be used by the transmitting apparatus to determine how many packets to split the larger packet into. Where there are multiple packets transmitted one after each other, this is known as a packet train. In other words, a packet train is a chain of packet pairs, each packet within the packet train (i.e. not an end packet) forming two packet pairs.

Another way in which the transmitting apparatus may be configured to create a packet pair is by creating a redundancy packet for multiple data packets and transmitting the redundancy packet as part of a packet pair. For example, the transmitting apparatus is configured to transmit a plurality of data packets. Redundancy information (for example, forward error correction codes) for each of the plurality of data packets may be formed by the transmitting apparatus and placed into a separate packet for transmission to the receiving apparatus. Hereinafter, this separate packet will be known as the redundancy packet. The transmitting apparatus is configured to transmit the redundancy packet as part of a packet pair. The other packet in the packet pair may be a data packet that has no relation to the redundancy information provided in the redundancy packet. The other packet in the packet pair may be a data packet for which the redundancy packet comprises redundancy information. The other packet in the packet pair may be another redundancy packet, comprising redundancy information for a plurality of packets.

It is understood that the transmitting apparatus may use at least one of the above-mentioned ways to create a packet pair when configuring the transmission stream following the determination that the number of packet pairs in the stream falls below a threshold amount.

The apparatus receiving the transmission stream (i.e. the receiving apparatus) is configured to receive the packet pairs and to transmit feedback to the transmitting apparatus relating to the capacity of the network over which the stream is transmitted. The feedback may be transmitted in the form of a report. The transmitting apparatus is configured to receive the feedback from the receiving apparatus. In response to receiving the feedback, the transmitting apparatus configures a transmission setting for the transmission stream. For example, the transmitting apparatus may determine a maximum transmission rate for the data packets and configure itself to not exceed this maximum transmission rate. Modulation and/or coding parameters for transmission may be set by the transmitting apparatus in dependence on the received feedback from the receiving apparatus. Alternatively or in addition, the transmitting apparatus may be configured to alter the session parameters in dependence on the received feedback. Alternatively or in addition, the transmitting apparatus may be configured to control the transmission stream to increase or decrease the rate of data being transmitted over the stream. The report/feedback may be provided using either an implicit or an explicit form.

The transmitting apparatus may be configured to make further determinations as to whether or not the number of packet pairs in the stream is above the threshold. For example, if the first determination is made at a first time, then a second determination may be made at a second time that is later than the first time. The threshold may still be represented as a number of packet pairs per unit time. The threshold may be a pure number representative of the number of packet pairs transmitted on the stream since the beginning of the session. The threshold may be a minimum number of packets to be transmitted consecutively as part of a packet train. The value of the threshold may be the same at the first time as it is at the second time. The value of the threshold may be different at the second time to the value of the threshold at the first time.

If the number of packet pairs in the stream is determined at the second time to be below the threshold, the transmitting apparatus is arranged to configure future packet transmissions to the other apparatus to have more packet pairs. The transmitting apparatus may do this using at least one of the ways detailed above.

If the number of packet pairs in the stream is determined at the second time to be above the threshold, the transmitting apparatus is arranged to stop configuring future packet transmissions to the receiving apparatus to have more packet pairs. In other words, the transmitting apparatus is configured to stop manipulating the stream to comprise more packet pairs. To do this, the transmitting apparatus may be configured to completely stop any form of manipulation of the transmission stream so as to cause at least one previously unscheduled packet pair transmission to occur. Alternatively, the transmitting apparatus may be configured to continue to manipulate the transmission of packets over the packet stream at the same or lesser level, so as to cause the same or fewer transmissions of previously unscheduled packet pair transmission to occur.

As mentioned above, it is useful for the transmitting apparatus to make a first determination of whether or not the number of packet pairs exceeds a threshold at the beginning of a media session. This is because it allows a relatively quick assessment of the capacity of a network at a time at which the information can be used for greatest effect. Further, as packet transmissions made over the transmissions stream increases, as happens over time, packet pairs may occur naturally. This may happen at data rates greater than around 300 kb/s. These naturally occurring packet pairs may also be used by the receiving apparatus to provide an indication to the transmitting apparatus regarding the quality of the network. However, it is understood that these naturally occurring packet pairs are not the result of the transmitting apparatus purposely manipulating packet transmission in the manner described above in such a way as to cause a packet pair transmission to occur.

The transmitting apparatus may be further configured to communicate with the receiving apparatus that the receiving apparatus should expect packet pairs if the number of packet pairs in the stream is determined to be below the threshold. By this, it is meant that the transmitting apparatus notifies the receiving apparatus that the transmitting apparatus will manipulate the transmission stream to increase the number of packet pairs.

The transmitting apparatus may indicate to the receiving apparatus how to recognise packets belonging to a packet pair. There are a number of ways in which this can be done, depending on the mechanism used to create the packet pairs. For example, where a packet pair is formed by the creation of a packet comprising redundancy information for multiple other packets, the receiving apparatus may be informed of that, including how to recognise the other packet transmitted as part of the packet pair. Such information for recognising packets belonging to a packet pair may be exchanged over a control protocol, such as the RTCP protocol in the RTP case.

It is understood that any number of the above-mentioned aspects may be combined in a single embodiment without any loss of generality.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). Where a particular device is arranged to execute a series of actions as a result of program code being executed on a processor, these actions may be the result of the executing code activating at least one circuit or chip to undertake at least one of the actions via hardware. At least one of the actions may be executed in software only. The program code can be stored in one or more computer readable memory devices. The features of the techniques described below are platform-independent, meaning that the techniques may be implemented on a variety of commercial computing platforms having a variety of processors.

For example, the user terminals configured to operate as described above may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the above, there is provided at least, an apparatus comprising: at least one processor; and a memory comprising code that, when executed on the at least one processor, causes the apparatus to: transmit or arrange to transmit a stream of packets to another apparatus; determine, at a first time, whether or not the number of packet pairs in the stream is above a threshold; and if the number of packet pairs in the stream is determined to be below the threshold, configure future packet transmissions to the other apparatus to have more packet pairs.

The code, when executed on the at least one processor, may further cause the apparatus to: receive feedback from the other apparatus relating to the capacity of the network over which the stream is transmitted; and modify a transmission setting for the stream in dependence on the feedback.

The threshold amount may indicate a minimum number of packet pairs to be transmitted per unit time.

The configuring of the future packet transmissions may be performed, at least in part, by duplicating packets to create packet pairs.

The configuring of the future packet transmissions may be performed, at least in part, by shifting the transmission time of packets to create packet pairs.

The configuring of the future packet transmissions may be performed, at least in part, by splitting up larger packets into smaller packets to create packet pairs.

The configuring of the future packet transmissions may be performed, at least in part, by creating a redundancy packet for multiple data packets and transmitting the redundancy packet as part of a packet pair.

The code, when executed on the at least one processor, may further cause the apparatus to: determine, at a second time later than the first time, whether or not the number of packet pairs in the stream is above the threshold; and if the number of packet pairs in the stream is determined at the second time to be below the threshold, configure future packet transmissions to the other apparatus to have more packet pairs. The code, when executed on the at least one processor, may further cause the apparatus to: if the number of packet pairs in the stream is determined at the second time to be above the threshold, stop configuring future packet transmissions to the other apparatus to have more packet pairs.

The code, when executed on the at least one processor, may further cause the apparatus to: make said determination at the beginning of a media session.

The code, when executed on the at least one processor, may further cause the apparatus to: communicate with the another apparatus that the another apparatus should expect packet pairs having a particular form if the number of packet pairs in the stream is determined to be below the threshold.

There is further described a method comprising: transmitting or arranging to transmit a stream of packets to another apparatus; determining, at a first time, whether or not the number of packet pairs in the stream is above a threshold; and if the number of packet pairs in the stream is determined to be below the threshold, configuring future packet transmissions to the other apparatus to have more packet pairs.

The method may further comprise: receiving feedback from the other apparatus relating to the capacity of the network over which the stream is transmitted; and modifying a transmission setting for the stream in dependence on the feedback.

The threshold amount may indicate a minimum number of packet pairs to be transmitted per unit time.

Said configuring future packet transmissions may comprise duplicating packets to create packet pairs.

Said configuring future packet transmissions may comprise shifting the transmission time of packets to create packet pairs.

Said configuring future packet transmissions may comprise splitting up larger packets into smaller packets to create packet pairs.

Said configuring future packet transmissions may comprise creating a redundancy packet for multiple data packets and transmitting the redundancy packet as part of a packet pair.

The method may further comprise: determining, at a second time later than the first time, whether or not the number of packet pairs in the stream is above the threshold; and if the number of packet pairs in the stream is determined at the second time to be below the threshold, configuring future packet transmissions to the other apparatus to have more packet pairs.

There is further provided a computer program product comprising computer code that, when run on an apparatus, causes the apparatus to: transmit or arrange to transmit a stream of packets to another apparatus; determine, at a first time, whether or not the number of packet pairs in the stream is above a threshold; and if the number of packet pairs in the stream is determined to be below the threshold, configure future packet transmissions to the other apparatus to have more packet pairs.

The invention claimed is:

1. An apparatus comprising:
   at least one processor; and a memory comprising code that, when executed on the at least one processor, causes the apparatus to:
  transmit or arrange to transmit a stream of packets to another apparatus;
  determine, at a first time, whether or not the number of packet pairs in the stream is above a threshold; and
  if the number of packet pairs in the stream is determined to be below the threshold, configure future packet transmissions to the other apparatus to have more packet pairs by shifting the transmission time of packets to create the packet pairs.

2. An apparatus as claimed in claim 1, wherein the code, when executed on the at least one processor, further causes the apparatus to:
  receive feedback from the other apparatus relating to a capacity of a network over which the stream is transmitted; and
  modify a transmission setting for the stream in dependence on the feedback.

3. An apparatus as claimed in claim 1, wherein the threshold amount indicates a minimum number of packet pairs to be transmitted per unit time.

4. An apparatus as claimed in claim 1, wherein said configure future packet transmissions is performed, at least in part, by duplicating packets to create packet pairs.

5. An apparatus as claimed in claim 1, wherein said configure future packet transmissions is performed, at least in part, by splitting up larger packets into smaller packets to create packet pairs.

6. An apparatus as claimed in claim 1, wherein said configure future packet transmissions is performed, at least in part, by creating a redundancy packet for multiple data packets and transmitting the redundancy packet as part of a packet pair.

7. An apparatus as claimed in claim 1, wherein the code, when executed on the at least one processor, further causes the apparatus to:
  determine, at a second time later than the first time, whether or not the number of packet pairs in the stream is above the threshold; and
  if the number of packet pairs in the stream is determined at the second time to be below the threshold, configure future packet transmissions to the other apparatus to have more packet pairs.

8. An apparatus as claimed in claim 7, wherein the code, when executed on the at least one processor, further causes the apparatus to:
  if the number of packet pairs in the stream is determined at the second time to be above the threshold, stop configuring future packet transmissions to the other apparatus to have more packet pairs.

9. An apparatus as claimed in claim 1, wherein the code, when executed on the at least one processor, further causes the apparatus to:
  make said determination at the beginning of a media session.

10. An apparatus as claimed in claim 1, wherein the code, when executed on the at least one processor, further causes the apparatus to:
  communicate with the another apparatus that the another apparatus should expect packet pairs having a particular form if the number of packet pairs in the stream is determined to be below the threshold.

11. A method comprising:
  transmitting or arranging to transmit a stream of packets to another apparatus;
  determining, at a first time, whether or not the number of packet pairs in the stream is above a threshold; and
  if the number of packet pairs in the stream is determined to be below the threshold, configuring future packet transmissions to the other apparatus to have more packet pairs by shifting the transmission time of packets to create the packet pairs.

12. A method as claimed in claim 11, further comprising:
  receiving feedback from the other apparatus relating to a capacity of a network over which the stream is transmitted; and
  modifying a transmission setting for the stream in dependence on the feedback.

13. A method as claimed in claim 11, wherein the threshold amount indicates a minimum number of packet pairs to be transmitted per unit time.

14. A method as claimed in claim 11, wherein said configuring future packet transmissions comprises duplicating packets to create packet pairs.

15. A method as claimed in claim 11, wherein said configuring future packet transmissions comprises splitting up larger packets into smaller packets to create packet pairs.

16. A method as claimed in claim 11, wherein said configuring future packet transmissions comprises creating a redundancy packet for multiple data packets and transmitting the redundancy packet as part of a packet pair.

17. A method as claimed in claim 11, further comprising:
  determining, at a second time later than the first time, whether or not the number of packet pairs in the stream is above the threshold; and
  if the number of packet pairs in the stream is determined at the second time to be below the threshold, configuring future packet transmissions to the other apparatus to have more packet pairs.

18. A computer-readable storage memory comprising computer code stored thereon that, when run on an apparatus, causes the apparatus to:
  transmit or arrange to transmit a stream of packets to another apparatus;
  determine, at a first time, whether or not the number of packet pairs in the stream is above a threshold; and
  if the number of packet pairs in the stream is determined to be below the threshold, configure future packet transmissions to the other apparatus to have more packet pairs by shifting the transmission time of packets to create the packet pairs.

* * * * *